Oct. 29, 1968  W. P. KRAFT  3,408,041
SLIDING BLOCK VALVE
Filed Dec. 13, 1965
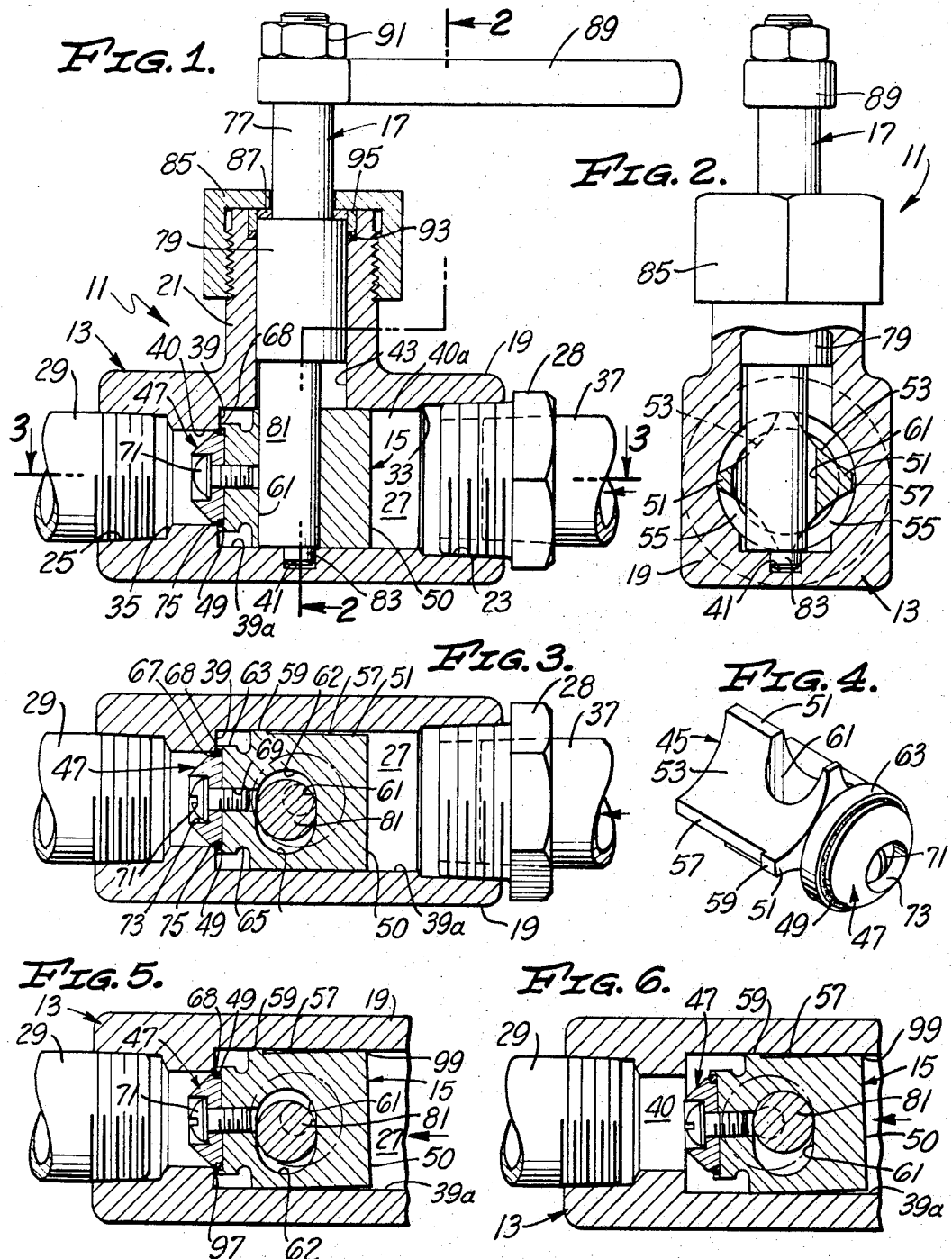
INVENTOR.
WILBUR P. KRAFT
BY HIS ATTORNEYS
HARRIS, KIECH, RUSSELL & KERN ns patent office 3,408,041
Patented Oct. 29, 1968

3,408,041
SLIDING BLOCK VALVE
Wilbur P. Kraft, 431 Lomita St.,
El Segundo, Calif. 90245
Filed Dec. 13, 1965, Ser. No. 513,410
10 Claims. (Cl. 251—260)

ABSTRACT OF THE DISCLOSURE

A valve comprising a cam-actuated valve element which is tilted relative to its seat as it is unseated to provide a fluid bypass which facilitates movement of the valve element away from its seat. The tilting of the valve element is achieved by recessing its periphery on one side thereof to provide a recessed peripheral surface spaced from the wall of a bore in which it is slidable.

Background of invention

This invention relates generally to the valve art and more particularly to a novel sliding block valve which has improved operating characteristics over known valves. Although there are many types of valves in use at the present time, each type has certain disadvantages due to the particular construction or operation thereof. Thus, the conventional ball valve is difficult to open under load particularly when line pressure is high, it requires a long handle to open, it wears rapidly, it requires a large housing to provide support for the ball, and it provides a relatively small flow orifice. Prior art gate valves wear rapidly and are suited only for low pressure systems. Conventional needle valves generally are slow opening and closing and provide poor flow characteristics. Thus, there has been a long felt need for a valve which can be quickly and easily opened and closed even under substantial line pressures and which provides a large orifice relative to the pipe diameter, thereby permitting a high flow rate through the valve.

Summary and objects of invention

Accordingly, it is an object of this invention to provide a novel sliding block valve of simple construction including a valve element which can be easily machined.

Another object of this invention is to provide a valve which can be easily and quickly opened and closed and which is suitable for use in high or low pressure systems.

A further object is to provide a valve which has a relatively small housing, yet provides a large flow orifice relative to the diameter of the pipe and thereby permits a high flow rate with relatively low pressure drop.

In some valves, line pressure is used to help urge the valve element tightly against the valve seat to assure that a fluid-tight seal is obtained. While this feature is quite advantageous in securing a fluid-tight seal, it impedes opening of the valve because the line pressure resists movement of the valve element to the open position.

Accordingly, another object of this invention is to provide a valve which can be easily and quickly opened even though line pressure urges the valve element tightly against the valve seat.

A further object is to provide a valve in which the valve element can be tilted during the initial opening operation to partially separate the valve element from the valve seat while allowing other portions of the valve element and valve seat to remain in contact.

Still another object of this invention is to provide a valve having a relatively small housing, a large flow area, and a high flow rate.

A further object of this invention is to utilize cam means engageable with the valve element for moving the valve element axially between the open and closed positions and for providing the torque necessary for tilting the valve element.

The invention, both as to its organization and method of operation, together with further objects and advantages thereof, may best be understood by reference to the following description taken in connection with the accompanying drawing.

Description of drawing

In the drawing:
FIG. 1 is a vertical sectional view of a valve constructed in accordance with the teachings of this invention;
FIG. 2 is a transverse sectional view taken along the line 2—2 of FIG. 1;
FIG. 3 is a horizontal sectional view taken along the line 3—3 in FIG. 1 and illustrating the valve in the closed position;
FIG. 4 is a perspective view of a valve element constructed in accordance with the teachings of this invention;
FIG. 5 is a fragmentary, horizontal sectional view similar to FIG. 3 but with the valve element tilted and the valve partially open; and
FIG. 6 is a fragmentary, horizontal sectional view similar to FIG. 5 but with the valve element in the open position.

Description of exemplary embodiment of invention

Referring to the drawing, and in particular to FIGS. 1–3 thereof, reference numeral 11 designates a novel sliding block valve constructed in accordance with the teachings of this invention. The valve 11 includes a housing 13, a valve element 15 slidably mounted within the housing, and a rotatable shaft 17 for moving the valve element.

The housing 13 includes a body portion 19 which is generally square in cross section and a generally cylindrical tubular portion 21 integral with and extending upwardly from the body portion. The body portion 19 has an inlet 23, an outlet 25, and a flow passageway 27 of varying diameter extending through the housing and connecting the inlet and the outlet.

The inlet 23 and the outlet 25 are threaded to receive a hollow threaded fitting 28 and a conduit 29, respectively, and provide abutments 33 and 35 against which the fitting and the conduit can be seated. A conduit 37 is threadedly secured to the fitting 28 and connects the flow passageway 27 with a source of fluid under pressure (not shown).

The flow passageway 27 extends axially through the body portion 19 and defines a shoulder or valve seat 39 intermediate its ends which generally faces the inlet 23. The valve seat 39 preferably lies in a single plane which is prependicular to the axis of the flow passageway 27. The flow passageway 27 is defined by a wall 39a and includes a cylindrical orifice 40 of reduced diameter and a cylindrical valve element mounting portion 40a in which the valve element 15 is slidably mounted. The flow passageway 27 also has a cylindrical bore 41 formed in the wall thereof, the axis of the bore being perpendicular to the axis of the flow passageway. The tubular portion 21 has a cylindrical opening 43 which is preferably coaxial with the bore 41 and in communication with the flow passageway 27.

The valve element 15 is slidably mounted in the portion 40a of the flow passageway 27 and includes a body member 45 (FIG. 4), a nose portion 47, and a resilient sealing member or O-ring 49. The body member 45 lies between the valve seat 39 and the inlet 23 and has a planar rear face 50, a plurality of circumferentially spaced radially extending webs 51 (four being shown) which are engageable with the wall 39a of the flow passageway 27 and a plurality of curved surfaces 53 between the webs (FIGS. 2 and 4). As shown in FIG. 2, the curved surfaces 53 and the wall 39a of the flow passageway 27 define a plurality of fluid passages 55 and around the valve element 15. The fluid passages 55 are of relatively large area and allow a high flow rate of fluid at relatively low resistance through the valve. The four webs 51, two of which extend horizontally and the other two of which extend vertically, slidably mount the valve element 15 in the flow passageway 27. The four webs 51 provide for suspension of the valve element 15 in the flow passageway along four axially extending lines and prevent binding. One of the horizontally extending webs 51 has a recessed peripheral surface 57 extending from the extremity of the body member 45 which is nearer the inlet 23 toward the valve seat 39. The recessed peripheral surface 57 is spaced slightly from the wall 39a of the flow passageway 27 and terminates in a shoulder or fulcrum 59 which is engageable with the wall of the flow passageway.

The body member 45 has a transverse, slightly off-center aperture 61 extending therethrough (FIG. 3) and is provided with a cylindrical portion 63 which is spaced substantially from the wall 39a of the flow passageway 27. The aperture 61 has semicircular lateral extremities 62 interconnected by planar wall portions. The cylindrical portion 63 is provided with an external annular groove 65, a large diameter bore 67 formed by an annular rim 68 engageable with the valve seat 39, and a theaded counterbore 69.

The nose portion 47 is preferbly substantially frustoconical and has a smaller diameter than the orifice 40 and the cylindrical portion 63. A screw 71, the head of which lies within a recess 73 in the nose portion 47, is screwed within the threaded bore 69 to secure the nose portion to the body member 45. If desired, the screw 71 may be integral with the nose portion 47. The O-ring 49 is compressed between an annular flange 75 on the nose portion 47 and the body member 45 and is engageable with the valve seat 39 to block the flow passageway 27. The annular rim 68 serves as a retainer for the O-ring 49 and helps form a fluid-tight seal.

The shaft 17 is utilized to move the valve element 15 within the flow passageway 27. The shaft 17 is preferably integral and includes an upper extension 77, a large diameter stem 79 rotatably mounted in the opening 43, a cylindrical cam or eccentric 81, and a stub shaft 83 rotatably mounted in the bore 41. The shaft 17 is held within the housing 13 by a retaining nut 85 and a thrust washer 87 and may be rotated by a handle 89 which is secured to the upper extension 77 by a nut 91. An O-ring 93 and an annular retainer 95 seal the shaft 17 within the housing.

The cam 81 extends through the aperture 61 of the valve element 15 and the axis of the cam is spaced from the axis of rotation of the shaft 17. As shown in FIG. 3, the diameter of the cam 81 is substantially equal to the diameter of the curved lateral extremities 62 of the aperture 61 so that the cam can slide therein. The dimension of the aperture 61 in the direction transverse to the longitudinal axis of the flow passageway 27 (FIG. 3) is also substantially equal to the diameter of the cam 81 so that the latter is slidable therein. As the cam 81 is rotated eccentrically when the handle 89 is pivoted, the cam will bear against the walls of the aperture 61 to move the valve element 15 between the closed position (FIG. 3) and the open position (FIG. 6).

For purposes of explaining the operation of the device, an imaginary line extending in a horizontal plane from the axis of rotation of the cam 81 to the point on the cam surface or periphery which is farthest from the aforementioned axis will be referred to as the major radius of the cam 81, and the cam will be considered to be at a dead center position when said major radius of the cam extends axially within the flow passageway 27. Preferably the major radius is positioned slightly beyond dead center, e.g., 5°–10°, when the valve element 15 is in the closed position. (In FIG. 3, the valve element 15 is shown as in its closed position with the major radius of the cam 81 about 30° short of dead center, but this can be modified in accordance with the preceding sentence.) In moving the valve element 15 from the closed to the open position the valve handle 89 is preferably rotated through slightly more than 180° so that the major radius of the cam 81 is again slightly beyond dead center as illustrated in FIG. 6. Thus, the cam 81 provides a toggle action at both extremities of its movement so as to hold the valve element 15 in either the open or the closed position and prevent it from possibly moving toward the other position due to mechanical vibration or water hammer.

Accordingly, by rotating the handle 89 through slightly more than one half of a revolution, the valve is quickly and easily opened or closed. If desired, suitable stops (not shown) can be provided to limit the amount of rotation of the handle 89. Alternatively, rotation of the handle 89 can be limited by engagement of the cam 81 with one of the curved extremities 62 of the aperture 61, as shown in FIG. 6, and by the engagement of the annular rim 68 and/or the sealing element 49 with the valve seat 39, as shown in FIG. 3. (Rotation of the handle 89 in opposite directions can be limited by engagement of the cam 81 with the respective extremities 62 of the aperture 81 if, as described above, the major radius of the cam is positioned slightly beyond dead center in both the closed and fully open positions of the valve element 15.)

Although fluids may pass through the valve in either direction, the normal direction of flow will be from the inlet 23 to the outlet 25, i.e., from right to left. Thus, the rear face 50 of the valve element 15 will be exposed to the relatively high inlet fluid pressure while the nose portion 47 will be exposed to the relatively low outlet line pressure. The net effect of the fluid pressure acting on the valve element 15 will be to urge the valve element tightly against the valve seat and to resist axial movement of the valve element from the closed to the open position. Although such fluid pressure is useful in helping to keep the valve tightly closed, it would make opening of conventional valve construction quite difficult.

To overcome this problem, the valve element 15 has been provided with the fulcrum 59 and the recessed peripheral surface 57 on one of the webs 51. With the valve in the closed position, the first slight increment of counterclockwise rotation of the cam 81 exerts a force against the wall of the aperture 61 which torques or tilts the valve element about the fulcrum 59 to the position illustrated in FIG. 5 in which a rear edge 99 (FIGS. 5 and 6) of the recessed surface 57 engages the wall 39a. The force of friction between the cam 81 and the wall of the aperture 61 may also urge the valve element 15 to tilt. The valve element tilts about an axis which is generally perpendicular to the axis of the flow passageway 27 to cause the valve element 15 and the valve seat 39 to separate along a portion of their area of engagement to provide a small port 97 (FIG. 5) therebetween. The relatively high pressure inlet fluid flows through the port 97 toward the outlet thereby tending to balance the fluid forces acting on the valve element. With these fluid forces in substantial balance, the handle 89 may be easily pivoted to move the valve axially to the fully open position illustrated in FIG. 6. The valve element 15 may remain tilted as it slides to the fully open position. This tilting feature to partially open the valve is useful not only in the specific valve construction illustrated herein but is useful in any type of valve in which it may be desirable to bleed relatively small quantities of fluid therethrough.

It is apparent therefore that a valve constructed in accordance with the teachings in this invention may be quickly and easily opened and closed even against relatively high line pressures. Although the valve housing is relatively small, the flow rate through the valve is high and the resistance is low. Because the valve element is locked in both the open and closed positions by a toggle action of the cam 81, the flow of fluid through the valve and mechanical vibrations will not move the valve element toward the other position.

Various changes, modifications, and substitutions may be made by one having ordinary skill in the art without necessarily departing from the spirit and scope of this invention.

I claim:

1. A valve for controlling the flow of a fluid under pressure comprising:

a housing having an inlet communicable with the fluid, an outlet, and a flow passageway extending through the housing and connecting said inlet and said outlet, said flow passageway defining a valve seat intermediate said inlet and said outlet;

a valve element slidably engaging the wall of said flow passageway and being slidable generally axially in said flow passageway between a closed position in which said valve element engages said valve seat to block said flow passageway and an open position in which said valve element is out of engagement with said valve seat to open said flow passageway, the area of engagement between said valve element and said valve seat sealing said flow passageway against the flow of fluid therethrough in said closed position;

tilting means operative when said valve element is in said closed position for tilting said valve element relative to said valve seat about an axis which is disaligned from the axis of said flow passageway, the tilting of said valve element causing said valve element to separate from said valve seat along a portion of said area of engagement, thereby partially opening said flow passageway, said tilting means comprising an axially extending recessed peripheral surface on the periphery of said valve element which is spaced from the wall of said flow passageway in said closed position to provide for said tilting movement of said valve element; and means for moving said valve element generally axially in said flow passageway between the open and closed positions.

2. A valve as defined in claim 1 wherein said valve seat generally faces said inlet and at least a portion of said valve element is disposed between said valve seat and said inlet in said open and closed positions, said portion of said valve element being exposed to the pressure of the fluid in said inlet and moving toward said outlet in moving into said closed position from said open position, the pressure of the fluid in said inlet resisting axial movement of said valve element from said closed position to said open position whereby when said valve element is tilted and partially opened some of the fluid is bled through said flow passageway to said outlet to counteract the pressure of the fluid in said inlet and thereby reduce the resistance of said valve element to axial movement.

3. A valve as defined in claim 1 wherein said means for moving said valve element generally axially includes a cam rotatable in said housing and engageable with said valve element.

4. A valve as defined in claim 1 wherein said means for moving said valve element generally axially includes toggle means for holding said valve element in said open or said closed position.

5. A valve as defined in claim 1 wherein said means for tilting said valve element includes a fulcrum on said valve element adjacent said recessed peripheral surface, said fulcrum being slidably engageable with the wall of said flow passageway.

6. A valve as defined in claim 1 wherein said means for tilting said valve element includes a fulcrum on said valve element adjacent said recessed peripheral surface and means for applying a torque to said valve element to tilt said valve element about said fulcrum, said fulcrum being slidably engageable with the wall of the flow passageway.

7. A valve as defined in claim 1 wherein said valve element includes a plurality of circumferentially spaced radially extending webs engageable with the wall of said flow passageway, the surfaces of said valve element between said webs and said wall of said flow passageway defining fluid passages, the periphery of one of said webs being recessed to provide said recessed peripheral surface spaced from the wall of said flow passageway in said closed position to provide for said tilting movement of said valve element.

8. A valve as defined in claim 4 wherein said webs are disposed between said valve seat and said inlet, said recessed peripheral surface of said one web extending from the extremity of said one web which is nearer said inlet toward said valve seat, said recessed peripheral surface terminating in a shoulder defining a fulcrum which is engageable with the wall of said flow passageway.

9. A valve as defined in claim 8 wherein said valve element has a transverse aperture extending therethrough, and wherein said means for tilting said valve element includes a cam journalled in said housing and extending through said aperture.

10. A valve as defined in claim 8 wherein said valve seat generally faces said inlet and said valve element includes a body member, a nose portion, and a sealing member, said body member being slidable in said flow passageway between said valve seat and said inlet and being engageable with said valve seat, said nose portion being releasably secured to said body member and lying at least partially between said valve seat and said outlet when said valve element is in said closed position, said body member having said webs thereon, said body member having an aperture extending transversely therethrough, and said means for moving said valve element generally axially and said means for tilting said valve element include an eccentric journalled in said housing and extending through said aperture.

References Cited

UNITED STATES PATENTS

| | | | |
|---|---|---|---|
| 1,474,790 | 11/1923 | Russell | 251—257 |
| 2,267,057 | 12/1941 | Verner | 251—257 |

WILLIAM F. O'DEA, *Primary Examiner.*

DAVID R. MATTHEWS, *Assistant Examiner.*